UNITED STATES PATENT OFFICE.

JAMES C. ARMOR, OF PITTSFIELD, MASSACHUSETTS, ASSIGNOR TO GENERAL ELECTRIC COMPANY, A CORPORATION OF NEW YORK.

ARC-WELDING COMPOSITION.

1,374,711.  Specification of Letters Patent.  Patented Apr. 12, 1921.

No Drawing.  Application filed August 30, 1919.  Serial No. 320,924.

*To all whom it may concern:*

Be it known that I, JAMES C. ARMOR, a citizen of the United States, residing at Pittsfield, in the county of Berkshire, State of Massachusetts, have invented certain new and useful Improvements in Arc-Welding Compositions, of which the following is a specification.

The present invention relates to arc welding and comprises an improved welding composition with which arc welding may be carried out with lower impressed voltages than heretofore and which will result in the deposition of better metal by the welding arc.

A welding composition embodying my invention contains titanium as a constituent and preferably is fusible at a temperature below the fusing temperature of the electrode with which it is used.

In order to maintain an alternating current welding arc with a plain iron or steel electrode, it is necessary to work with an impressed voltage of about 100 to 125 volts, the particular voltage required depending somewhat on the skill of the welder and the character of the work. In the case of direct current, the required range of voltage is somewhat lower, being ordinarily within the range of about 60 to 70 volts. Somewhat lower voltages can be used with electrodes covered with mineral compositions but the use of the coatings heretofore employed has been attended by certain disadvantages, such, for example, as the inclusion of slag in the weld.

I have discovered that by the use of a welding composition containing titanium and an alkali, or alkaline earth metal, as elementary constituents, preferably as an alkali or alkaline-earth titanate, the open circuit voltage required to operate a welding arc is materially reduced and metal of better quality is deposited by the arc than has been obtainable with welding compositions formerly used. For example, when welding with a ferrous metal electrode, associated with my improved welding flux, good arc welds may be made when using alternating current with an open circuit voltage of about 35 to 45 volts, or even lower depending on the conditions of the weld. When using direct current with my new welding composition good welds may be made with about 25 volts on open circuit.

An arc welding composition comprising my invention may be applied in any desired manner either as a coating upon the electrode, as a core within the electrode, or in an open channel or groove extending lengthwise the electrode.

When the welding composition is applied as a coating it may be applied either in the fused state, or with a suitable binder. For example, by the use of a suitable flux a vitreous enamel may be produced upon the surface of the electrode. A suitable composition for this purpose is as follows, the parts being given by weight.

| | |
|---|---|
| Rutile | 25 parts. |
| Manganese dioxid | 15 " |
| Calcium carbonate | 10 " |
| Potassium carbonate | 30 " |
| Sodium carbonate | 18 " |
| Borax | 10 " |
| Cobalt oxid (black) | 20 " |

This mixture is fused thereby causing chemical combination of the rutile forming a titanate. The fusion may be granulated by running it into water. The material is ground and mixed with water to make a thin paste. Preferably a fluxing material, as for example, about 10% of ball clay is added to assist in maintaining the powdered welding composition in suspension and also to provide a binder which will hold the material on the welding electrode when fired. A little borax may be added to assist in causing adhesion of the welding composition to the wire but is not essential. The composition is coated on the welding electrodes and the coated electrodes dried and baked at a bright red heat to convert the coating into an enamel.

In accordance with another modification of my invention a mixture of a titanium compound, a compound of alkali metal and a suitable amount of an air drying binder such, for example, as a silicate of alkali metal, preferably potassium silicate, is applied to the electrodes. A suitable composition contains 44 parts of rutile and 60 parts of sodium carbonate. The electrodes may be dipped into the mixture, which should be suitably thinned with water. The coating then is air dried. In some cases the binder may be omitted, the electrodes being coated with a mixture of rutile or other desired titanium compound, and a compound of an alkali metal, preferably suspended in water.

For some purposes the welding electrode may be associated with the welding composition by dipping it into a fused mass containing a titanium compound and a compound of an alkali metal.

When the arc welding electrodes are to be used in an automatic welding machine in which they are fed continuously through rolls, also acting to convey the welding current by their contact with the electrode, it is not always desirable to employ a coating upon the electrode which interferes with passage of electric current. In fact, a coating, when applied as an enamel, may completely insulate the electrode. When the welding electrode is to be used in an automatic machine, the welding composition may be applied as a core or placed in a groove or channel.

In some cases, particularly when using potassium titanate, the material may be applied as a sufficiently thin coating to permit of the conduction of current to the electrode through the coating and still secure the benefit of a reduction in open circuit voltage of the welding current.

Welds made by the use of my improved composition are unusually sound, dense and free from slag inclusion and blow holes. Tests show weld-deposited metal to be more ductile when deposited from an electrode containing my welding composition than metal deposited from bare wire.

What I claim as new and desire to secure by Letters Patent of the United States, is:—

1. An arc welding electrode containing in a combined state both titanium and a metal having alkaline properties.

2. An arc welding composition containing a compound of titanium and an alkali metal.

3. An arc welding composition containing a titanate.

4. An arc welding electrode comprising a metal associated with a welding composition fusible below the temperature of said metal and containing a titanium compound.

5. An arc welding electrode containing a flux comprising titanium as an elementary constituent and fusing at a temperature no higher than the fusing temperature of said electrode.

In witness whereof I have hereunto set my hand this 29th day of August, 1919.

JAMES C. ARMOR.